United States Patent [19]
Glaze et al.

[11] 3,714,784
[45] Feb. 6, 1973

[54] FUEL SUPPLY SYSTEMS FOR JET AIRCRAFT ENGINES

[75] Inventors: Stanley G. Glaze, Kingswinford; Donald Craven, Wolverhampton, both of England

[73] Assignee: H. M. Hobson Limited, London, England

[22] Filed: Feb. 18, 1971

[21] Appl. No.: 116,413

[52] U.S. Cl. ............... 60/241, 60/39.28 R, 60/243
[51] Int. Cl. ............................. F02k 3/10, F02c 9/04
[58] Field of Search ...................... 60/241, 243, 261

[56] References Cited

UNITED STATES PATENTS 3,293,856  12/1966  Tyler .................................... 60/241
3,293,847  12/1966  Rogers ................................. 60/241
3,067,576  12/1962  Campbell ............................ 60/241

Primary Examiner—Carlton R. Croyle
Assistant Examiner—Robert E. Garrett
Attorney—Martin Kirkpatrick

[57] ABSTRACT

A reheat fuel control system for a jet aircraft engine, which comprises an engine-driven pump arranged to deliver fuel to primary, gutter and collander manifolds through individual primary, gutter and collander flow control valves, a three dimensional cam which is in joint control of the three control valves so as to maintain flows in the three manifolds which are desired functions of engine conditions, and means for controlling the metering pressure across the primary flow control valve as a function of engine speed.

9 Claims, 5 Drawing Figures

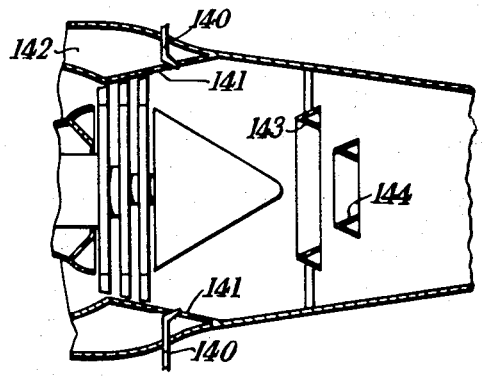
Fig. 5.
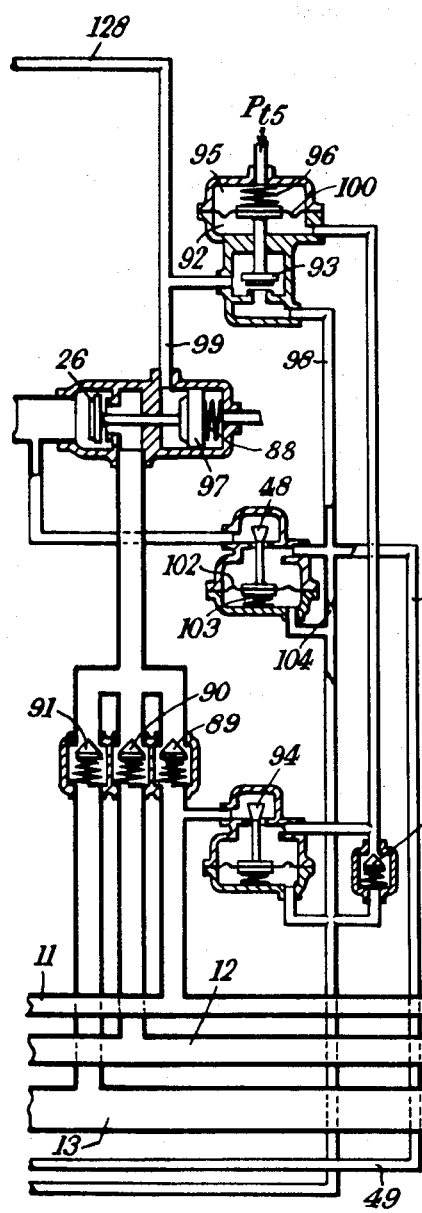
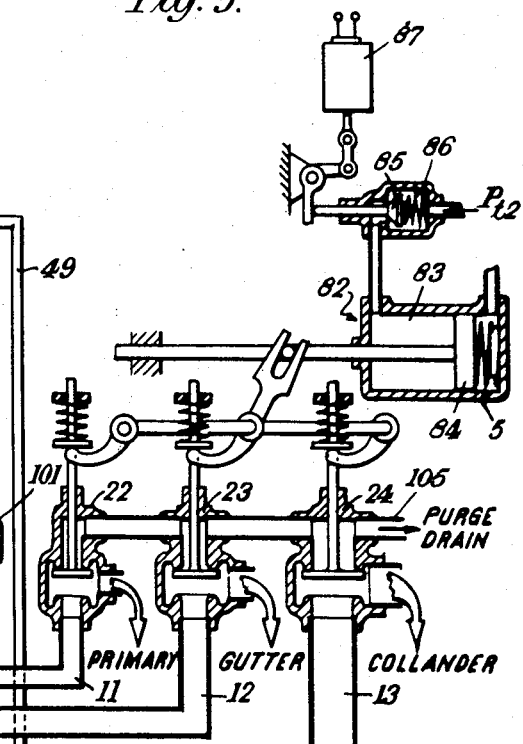
Fig. 4.

FUEL SUPPLY SYSTEMS FOR JET AIRCRAFT ENGINES

This invention provides a reheat fuel control system for a jet aircraft engine.

The reheat fuel control system according to the invention comprises an engine-driven pump arranged to deliver fuel to primary, gutter and collander manifolds through individual primary, gutter and collander flow control valves, a three dimensional cam which is in joint control of the three control valves so as to maintain flows in the three manifolds which are desired functions of engine conditions, and means for controlling the metering pressure across the primary flow control valve as a function of engine speed.

The system described in more detail below includes an electrical turndown actuator, constituted by an A.C. motor, providing a mechanical input signal to a hydromechanical fuel control system.

The fuel control system employs purely mechanical elements. Velocity cleaned filters are fitted to protect all servo restrictors and servo valves from dirt particles.

An inlet throttle valve to the pump which supplies fuel to the reheat system is servo controlled by a mechanical governor and a fuel potentiometer to maintain the metering pressure across the primary flow control valve as a function of the speed of the high speed spool of the engine compressor and engine inlet total temperature. The governor flyweights, which are fully immersed in fuel, are designed to give automatic density compensation by varying the metering pressure with fuel density.

The metering pressure across the gutter flow control valve is held equal to that across the primary flow control valve by a repeater unit which compares the two downstream fuel pressures and throttles either the gutter or the primary flow to maintain equal pressures downstream of the flow control valves.

The flow to the collander manifold varies according to a different function of inlet total temperature. This is achieved by a second repeater unit which maintains the collander metering pressure equal to a potentiometered proportion of the primary metering pressure, the potentiometer ratio being varied with engine inlet total temperature.

The flow to the gutter and collander manifolds also varies as a function of the electrical input signal and delivery pressure $Pt_2$ from the high pressure stage of the compressor of the engine, and the primary flow as a function of $Pt_2$. This is achieved by the single three dimensional cam whose axial displacement is varied with $Pt_2$ and whose rotation is controlled mechanically by the turndown actuator. The primary control valve is positioned by the axial displacement of the cam and the gutter and collander control valves are positioned in response both to axial displacement and to rotation of the cam by separate cam followers, full closure of these valves being prevented so as to ensure a minimum flow to maintain manifold prime during reheat operation. Manifold priming is applied by a by-pass priming line which feeds fuel into each channel downstream of the control valves once the pump is primed by energizing a solenoid-operated fuel inlet valve, which is mechanically interlocked with the fuel purge valves. A micro switch is provided to indicate selection of purge. The solenoid provides automatic shut-down in the event of loss of A.C. power supplies. A fuel servo system detects the rise in manifold pressure once priming is completed and closes the priming line shut-off valve, and subsequently releases a shot of fuel from a hot shot unit. Non-return valves in the priming line to each manifold prevent the transfer of fuel between manifolds once the shut-off valve is closed. The hot shot unit is primed simultaneously with the manifolds and directs a fixed shot of fuel at all flight conditions to the ignition jets following closure of the priming shut-off valve.

One embodiment of reheat control system according to the invention will now be described in details, by way of example, with reference to the accompanying drawings, in which:

FIGS. 2 – 4 show parts of the system on a larger scale, and

FIG. 5 is a diagram showing the reheat burners.

Figure 1:
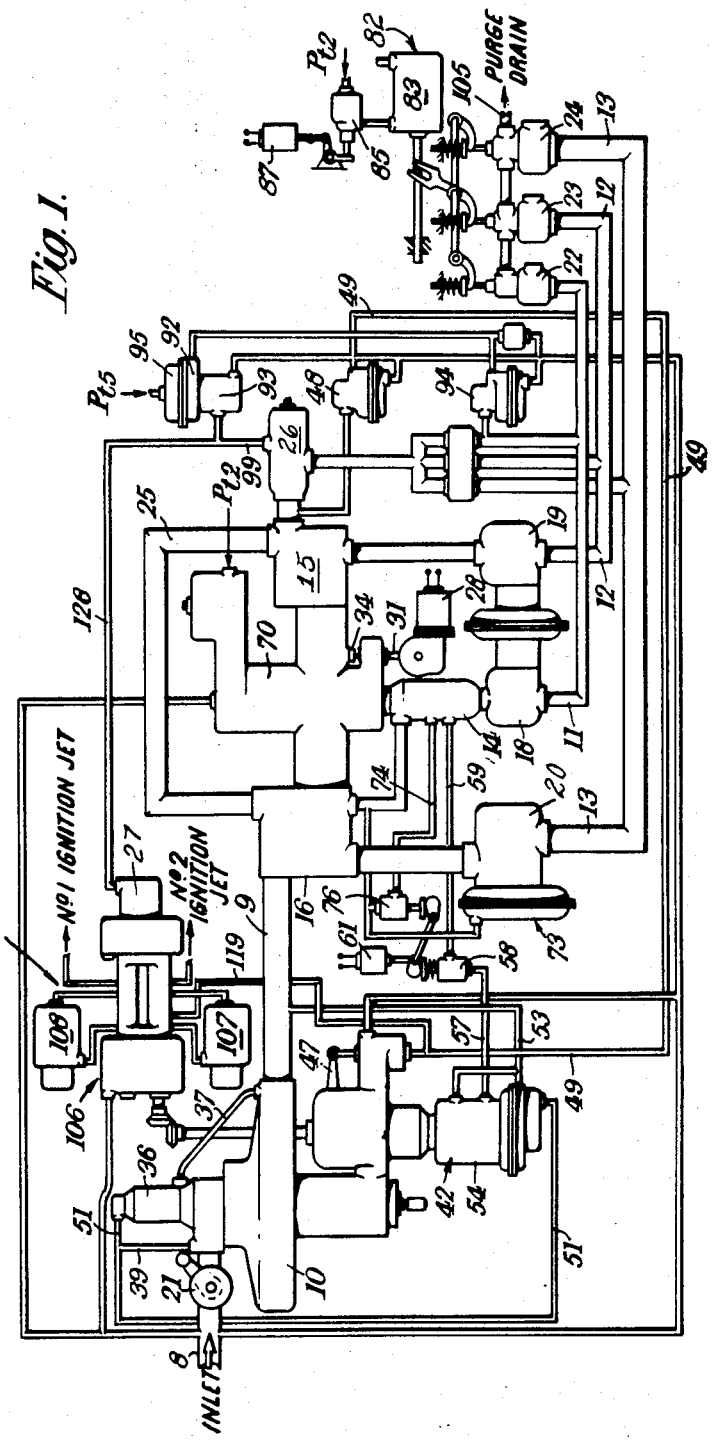
FIG. 1 shows the complete system apart from the burners.
Figure 2:
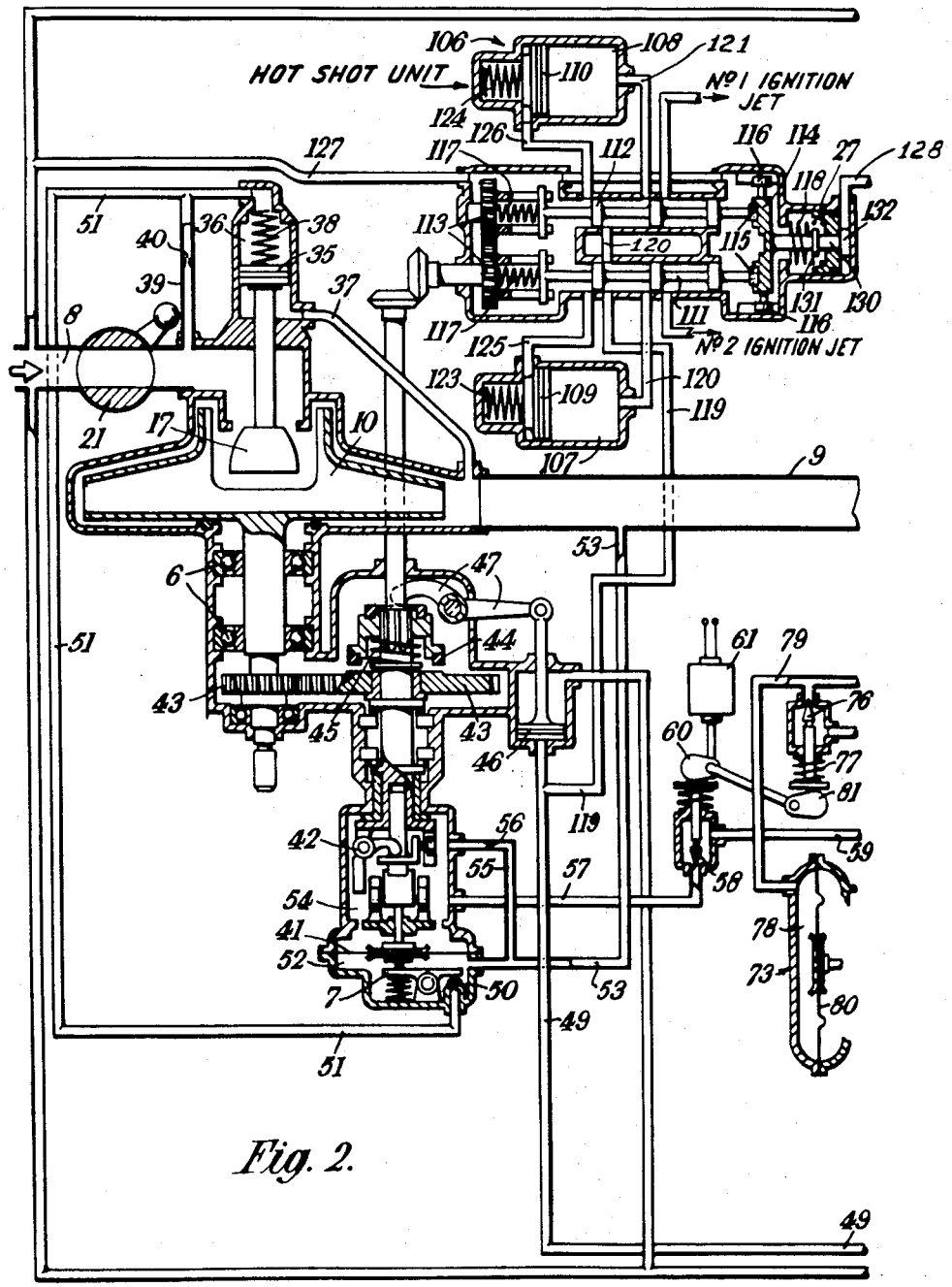
Figure 3:
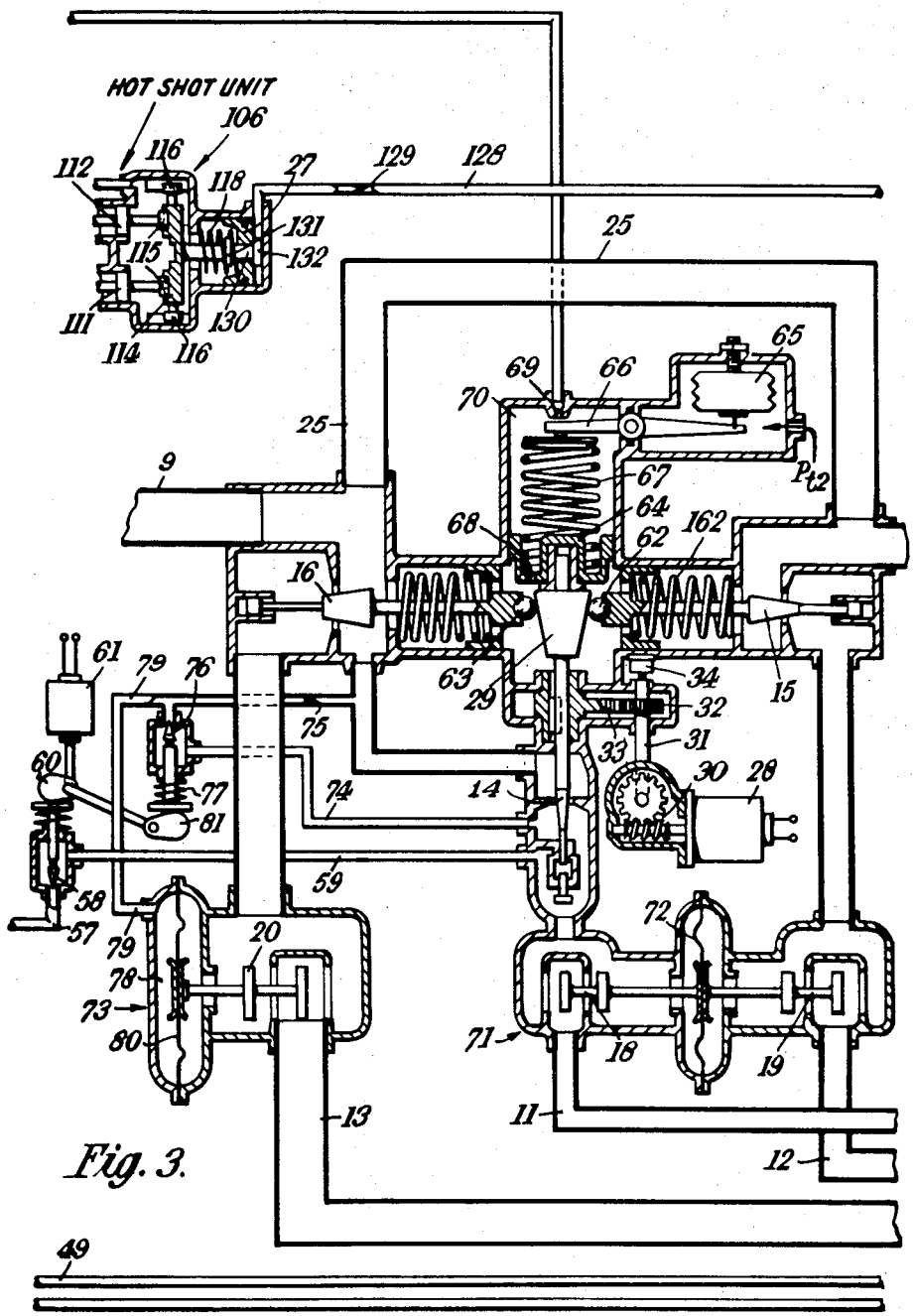

Fuel is supplied from an inlet 8 by a centrifugal pump 10 and a passage 9 to passages 11, 12, 13 leading to primary, gutter and collander manifolds via flow control valves 14, 15 and 16 respectively. The metering pressure across each flow control valve is scheduled, as described below, as a function of the speed of the high pressure spool of the compressor and of inlet total temperature by varying the position of a pump inlet throttle valve 17 to regulate the pump delivery pressure so as to maintain the required metering pressure. The downstream pressure for each flow control valve is regulated by repeater valves 18, 19 and 20 respectively so as to achieve the required metering pressures with a common upstream pressure, by using the metering pressure of the primary control valve 14 as a datum.

A fuel inlet valve 21 and manifold purge valves 22, 23 and 24 are interlocked to ensure that fuel is not admitted to the pump with the purge valves open. A bypass channel 25 is provided for priming the fuel manifolds, and the sequence of operation of a priming line shut-off valve 26 and a hot shot unit actuator 27 is such that the hot shot is not released until the priming by-pass has been shut off.

A turndown actuator is electrically signalled, upon selection of reheat, from a control amplifier and consists of an A.C. motor 28 which controls the angular position of a three-dimensional cam 29 through a worm reduction gear 30, and a shaft 31 driven by the gear 30 and carrying a gear 32 meshing with a quadrant 33 fixed to the cam 29. A rotary A.C. pick-off 34 is driven from the shaft 31 and provides an electrical position feedback signal to the control amplifier. The resultant angular displacement of the three-dimensional cam 29 is proportional to the input signal to the amplifier.

The pump 10 is driven from the high pressure spool of the engine compressor. The fuel inlet throttle valve 17 is operated by a servo piston 35 and regulates the flow of fuel from the low pressure system of the aircraft into the pump so as to maintain the required pump delivery pressure. The pump shaft is mounted in oil-lubricated ball bearings 6. The position of the inlet throttle valve 17 is controlled by the servo pressure in a chamber 36, which is connected to the pump inlet by a passage 39 containing a restrictor 40. Pump delivery pressure acts via a passage 37 on the smaller area of the piston 35. The larger area of the piston is subject to the pressure of a spring 38. The piston 35 varies the position of the inlet throttle valve 17 so as to maintain the metering pressure drop across the primary flow control valve 14 as a function of the speed of the high pressure spool of the compressor. This is achieved by comparing the force due to the pressure drop across a diaphragm 41 with the force applied to the diaphragm by a governor 42. The governor is driven from the pump shaft by spur reduction gears 43 and a friction clutch 44. The density of the governor fly-weights is such that the metering pressure is varied with fuel density to provide automatic compensation of fuel mass flow for variations in fuel density. The clutch 44 is loaded to the open position by a spring 45 and engaged by an actuating piston 46 and a lever 47. The piston 46 is operated by regulated pump delivery pressure from a pressure regulating valve 48 via a passage 49. The spring 45 ensures that the clutch 44 is disengaged when reheat is selected OFF so that the governor 42 is stationary in this condition, eliminating churning losses when there is no circulation of fuel.

Any error in primary metering pressure affects the force balance at the governor 42 causing movement of a beam 7 which is positioned by the diaphragm 41. This causes a variation in effective area of a nozzle 50 which modifies the servo pressure in a passage 51 connected to the chamber 36 so that the piston 35 varies the position of the inlet throttle valve 17 in a sense to restore the primary metering pressure to the correct value.

Fuel is supplied to a servo chamber 52 at pump delivery pressure via a passage 53 and returns to the pump inlet via the passages 51 and 39 and the restrictor 40. The inlet throttle valve 17 is spring loaded to the open position by the spring 38 to ensure that full flow is available for priming the manifolds upon selection of reheat.

Fuel is supplied to a governor chamber 54 from the pump delivery line via passages 53 and 55 and a restrictor 56. It then passes to the primary line downstream of the flow control valve 14 via a passage 57, an orifice controlled by an adjustable needle 58 and a passage 59. The needle 58 is controlled by a cam 60 rotated by a temperature actuator 61 so that the primary metering pressure is also varied as a function of inlet total temperature.

The pump delivery pressure is accordingly controlled so that the primary metering pressure varies with H.P. compressor speed and inlet total temperature to give a primary mass flow which is a function of these two parameters at a given setting of the flow control valve 14.

The three-dimensional cam 29 positions the gutter and collander flow control valves 15 and 16 by means of cam followers 62, 63 loaded by springs 162, 163 so that the lift of these valves in a function of both the axial and the rotary displacement of the cam. The primary flow control valve 14 is mounted on the shaft of the cam 29 and its position is a function of axial displacement only of the cam. The rotational displacement of the cam is controlled by the turndown actuator as described above.

The axial displacement of the cam 29 is varied linearly with H.P. compressor delivery pressure $Pt_2$ by a servo piston 64. Air at pressure $Pt_2$ acts on a capsule 65 producing a force on a beam 66 proportional to the compressor pressure. This force is normally balanced by the force in a spring 67 compressed between the beam and the servo piston 64. Fuel at pump delivery pressure flows through a restricted orifice 68 in the servo piston 64 and back to the fuel inlet via a nozzle 69, the effective area of which is controlled by the lift of the beam 66. Any force unbalance at the beam alters its lift so as to modify the servo pressure in the chamber 70 and restore the force balance by changing the pressure drop across the servo piston 64. The position of the piston 64 and hence the axial position of the cam 29 therefore varies with the compressor pressure $Pt_2$ acting on the capsule 65.

The hot stream metering system controls the fuel flow through the passages 11, 12 to the primary and gutter manifolds and employs a common metering pressure which is controlled by the servo unit of the pump 10. This metering pressure is set up across the primary flow control valve 14 as described above and repeated across the gutter flow control valve 15 by a pressure repeater unit 71. Since each flow control valve is supplied with fuel at pump delivery pressure, the repeater unit compares the fuel pressures downstream of the valves 14, 15 across a diaphragm 72 and throttles either the primary or the gutter flow by means of the repeater valve 18 or 19 to balance the two downstream pressures. It is necessary to have the capability of throttling either flow since the gutter manifold pressure may be greater or smaller than the primary manifold pressure dependant on the reheat flow demand signal. The opening of the primary control valve 14 is varied with H.P. compressor pressure $Pt_2$ and the opening of the gutter control valve 15 is varied with both H.P. compressor pressure $Pt_2$ and electrical demand signal as described above.

The cold stream metering system controls the fuel flow to the collander manifold 13 and employs a metering pressure which is a fraction of the primary metering pressure. This is achieved by a pressure repeater unit 73 and a fuel potentiometer. The fuel potentiometer consists of a servo-passage 74 which bypasses the primary control valve 14 via a fixed restrictor 75 and a variable restrictor controlled by a needle 76 biased towards open position by a spring 77. The pressure from the potentiometer is applied to a chamber 78 of the repeater unit via a passage 79, and compared at a diaphragm 80 with the pressure downstream of the collander control valve 16. Any pressure unbalance at the diaphragm 80 causes the valve 20, which throttles the collander flow, to move so as to restore the pressure balance. The needle 76 is controlled by a cam 81 rotated by the temperature actuator 61 and varies the proportion of the primary metering pressure sensed at the pressure repeater unit 73 with inlet temperature. The opening of the control valve 16 is varied with both H.P. compressor pressure $Pt_2$ and electrical demand signal as described above.

The metering system thus provides a primary fuel flow scheduled as a function of H.P. spool speed, H.P. compressor pressure $Pt_2$ and inlet total temperature. The gutter and collander fuel flows are scheduled, in addition, as functions of the electrical demand signal.

The interlocked inlet valve 21 and manifold purge valves 22, 23 and 24 are operated by a single pneumatic actuator 82. The actuator is powered by H.P. compressor bleed air at pressure $Pt_2$ which is ported to a chamber 83, containing a piston 84 loaded by a spring 5, by means of a servo valve 85, biased by a spring 86 and opened by a solenoid 87.

Upon selection of reheat, the solenoid 87 opens the servo valve 85 to cause the fuel inlet valve 21 to be opened to admit fuel to the pump 10 and the purge valves 22-24 to be closed. The pump 10 is self priming since the inlet throttle valve 17 is spring-loaded to the open position, and as soon as delivery pressure is established the actuating piston 46 causes the clutch 44 to engage the drive to the governor 42.

The priming shut-off valve 26 is loaded by a spring 88 to the open position and allows fuel to by-pass the metering system and enter the passages 11, 12, 13 leading to the three manifolds via non-return valves 89, 90, 91. Once the manifolds are fully primed there is a build-up in primary manifold pressures, which is applied to the chamber 92 of a priming servo valve 93 via a regulating valve 94. Jet pipe pressure $Pt_s$ is applied to a chamber 95 and the valve 93 opens against the pressure of a spring 96 at a preset pressure differential to admit fuel at pump delivery pressure to the actuating piston 97 of the by-pass shut-off valve 26 via passages 98 and 99. The by-pass valve 26 then closes but manifold prime is maintained by the flow through the control valves 14, 15 and 16 which are prevented from closing fully by means of limit stops (not shown).

The pressure regulating valve 94 limits the maximum manifold pressure applied to the chamber 92 so as to prevent overloading of the diaphragm 100 in that chamber. A nonreturn valve 101 also acts as a flow restrictor when the valve 94 is in control.

The pressure regulating valve 48, which is connected to a diaphragm 102 loaded by a spring 103, limits the pump delivery pressure transmitted to the servo valve 26. A restrictor 104 passes a bleed flow to inlet to enable the valve 48 to control the servo pressure in the passage 98.

When reheat is selected OFF the fuel inlet valve 21 is closed, and the fuel purge valves 22, 23 and 24 are opened by the pneumatic actuator 82.

The purge valves 22-24 close the fuel delivery passages 11, 12, 13 leading to the manifolds and port the manifolds (not shown) to a purge drain 105, thus permitting continuous reverse purging.

Fuel for the ignition jets is supplied by a hot shot unit 106. This consists of cylinders 107 and 108 containing pistons 109 and 110 which respectively inject metered quantities of fuel into Nos. 2 and 1 ignition jets (not shown). The pistons 109 and 110 are controlled by spool valves 111 and 112 which are spun by a drive from the governor shaft to spur gears 113. The spool valves are two-position valves operated by the actuating piston 27 and a yoke 114. The yoke 114 bears on the ends of the spool valves through carbon thrust pads 115 and is prevented from rotating by rollers 116 located in slots in a surrounding housing which permit axial movement of the yoke.

When reheat is off the spool valves 111, 112 are spring-loaded to the right hand position by springs 117. Another spring 118 acts in the same sense on the piston 27. Upon selection of reheat, fuel at regulated pressure from the passage 49 is admitted to the cylinder 107 via passages 119 and 120 and to the cylinder 108 via passages 119, 121 and 122, thus compressing springs 123 and 124 and priming the hot shot unit. Fuel displaced by the pistons 109 and 110 is returned to the pump inlet via passages 125, 126 and 127.

When the reheat manifolds have been primed pressurized fuel, in addition to being ported to the by-pass shut-off valve 26, is also ported to the hot shot unit actuating piston 27, via a passage 128 containing a flow restrictor 129. The piston 27 is located on the yoke shaft 130 between two stops 131, 132 which, together with the restrictor 129, provide a small delay in switching the position of the spool valves 111, 112 to ensure that the by-pass shut-off valve 26 has closed before the hot shot is released. Once the spool valves 111, 112 have been switched to the left hand position pressurized fuel is ported behind the pistons 109, 110 via the passages 125 and 126 and the cylinders 107 and 108 are ported to Nos. 2 and 1 ignition jets. The pistons 109, 110 are driven through full stroke by the combination of spring force and pressurized fuel, causing a metered volume of fuel to be discharged through each ignition jet.

The temperature actuator 61 is electrically signalled from the control amplifier and consists of a small A.C. motor which rotates the cams 60 and 81. An A.C. pick-off provides an electrical position feedback signal to the control amplifier so that the angular displacement of the cams is proportional to the electrical inlet temperature signal.

The above described system embodies the following features which contribute to simplicity of operation and therefore provide a saving in weight.

1. A three dimensional cam 29 controls each of the flow control valves 16, 15 and 14. The position of the valves 16, 15 and 14 is a function of the high pressure compressor pressure $Pt_2$ which is applied to the capsule 65, which in turn acts to control the axial position of the three dimensional cam 29. The valves 16 and 15 are also positioned under control of the actuator 28, which acts to rotate the cam 29. The unit 34 provides positional feedback. Metering pressure across the valve 14 is identical to that across the valve 15.

2. The provision of a device (repeater valves 19 and 18) to equalize the down stream pressures of the valve 15 and 14 simplifies the system and eliminates the need to repeat for the flow controls individually the provision for speed and temperature functions.

3. The provision of means (the diaphragm 80, the valve 20 and the restrictor 75, the needle 76 and the cam 81) to enable the metering pressure across the valve 16 to vary as a function of engine speed and also as a function of air inlet temperature.

4. An arrangement which provides a metering pressure across the primary control valve 16 which is a function of the engine high pressure spool speed (translated to a speed on the governor) and also a function of engine inlet total temperature, as sensed externally and signalled electrically to the unit 61.

The reheat burners are shown diagrammatically in FIG. 5. The burners 140 which receive fuel from the collander manifold spray fuel on to a collander 141 constituted by a perforated frustoconical plate and are supplied with relatively cold air from the compressor of the engine which has bypassed the turbine and which flows through an annular passage 142. Gas from the outlet of the turbine is supplied to a gutter burner 143, which receives fuel from the gutter manifold, and to a primary burner 144 which receives fuel from the primary manifold.

What we claim as our invention and desire to secure by Letters Patent is:

1. A reheat fuel control system for a jet aircraft engine, which comprises an engine-driven pump arranged to deliver fuel to primary, gutter and collander manifolds through individual primary, gutter and collander flow control valves, a three dimensional cam which is in joint control of the three control valves so as to maintain flows in the three manifolds which are desired functions of engine conditions, said primary flow control valve being operable to control flow in the primary manifold in response to axial movement only of said cam and said gutter and collander flow control valves being operable to control flow in the gutter and collander manifolds respectively in response both to axial movement and to rotation of said cam, means responsive to variations in delivery pressure $Pt_2$ from the high pressure stage of the compressor of the engine for imparting axial movement to said cam, means operable in response to selection of reheat by the pilot for imparting rotational movement to said cam and means for controlling the metering pressure across the primary flow control valve as a function of engine speed.

2. A fuel control system as claimed in claim 1, in which said means operable in response to selection of reheat includes an electrical turndown actuator operable under pilot's control to provide a mechanical signal to the three dimensional cam.

3. A fuel control system as claimed in claim 1, which includes a repeater unit arranged to compare the fuel pressures downstream of the primary flow control valve and the gutter flow control valve and operative to throttle either the gutter or the primary flow to maintain equal pressures downstream of the flow control valves.

4. A reheat fuel control system for a jet aircraft engine, which comprises an engine-driven pump arranged to deliver fuel to primary, gutter and collander manifolds through individual primary, gutter and collander flow control valves, a three dimensional cam which is in joint control of the three control valves so as to maintain flows in the three manifolds which are desired functions of engine conditions, an inlet throttle valve controlling the flow of fuel to the pump, a mechanical governor driven by the pump, and a servo mechanism controlled jointly by the governor and by the pressure drop across the primary flow control valve and operative to adjust the inlet throttle valve to vary the metering pressure across the primary metering valve as a function of engine speed.

5. A fuel control system as claimed in claim 4, which includes means for controlling the inlet throttle valve to vary the metering pressure across the primary metering valve as a function of engine inlet total temperature.

6. A reheat fuel control system for a jet aircraft engine, which comprises an engine-driven pump arranged to deliver fuel to primary, gutter and collander manifolds through individual primary, gutter and collander flow control valves, a three dimensional cam which is in joint control of the three control valves so as to maintain flows in the three manifolds which are desired functions of engine conditions, and means for controlling the metering pressure across the primary flow control valve as a function of engine speed, said means including a first repeater unit arranged to compare the fuel pressures downstream of the primary flow control valve and the gutter flow control valve and operative to throttle one of the gutter and the primary flow to maintain equal pressures downstream of the flow control valves, and a second repeater unit which maintains the metering pressure across the collander flow control valve at a fraction of that across the other flow control valves, which fraction varies with engine inlet total temperature.

7. A reheat fuel control system for a jet aircraft engine, which comprises an engine-driven pump arranged to deliver fuel to primary, gutter and collander manifolds through individual primary, gutter and collander flow control valves, a three dimensional cam which is in joint control of the three control valves so as to maintain flows in the three manifolds which are desired functions of engine conditions, a normally closed fuel inlet valve to the pump which is mechanically interlocked with fuel purge valves, means operative in response to switching on of reheat to open the fuel inlet valve and close the purge valves, and means for controlling the metering pressure across the primary flow control valve as a function of engine speed.

8. A fuel control system as claimed in claim 7, which includes a priming line which by-passes the flow control valves, and a shut-off valve sensitive to manifold pressure and operative to close the priming line when priming is completed.

9. A fuel control system as claimed in claim 8, which includes a hot shot unit arranged to be primed with the manifolds and operative to release a shot of fuel to reheat ignition jets after closure of the priming line by the shut-off valve.

* * * * *